United States Patent
Martin Brualla et al.

(10) Patent No.: US 12,518,472 B2
(45) Date of Patent: Jan. 6, 2026

(54) DEFORMABLE NEURAL RADIANCE FIELDS

(71) Applicant: GOOGLE LLC, Mountain View, CA (US)

(72) Inventors: Ricardo Martin Brualla, Seattle, WA (US); Keunhong Park, Seattle, WA (US); Utkarsh Sinha, Seattle, WA (US); Sofien Bouaziz, Los Gatos, CA (US); Daniel Goldman, Seattle, WA (US); Jonathan Tilton Barron, Alameda, CA (US); Steven Maxwell Seitz, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 224 days.

(21) Appl. No.: 18/251,995

(22) PCT Filed: Jan. 14, 2021

(86) PCT No.: PCT/US2021/070032
§ 371 (c)(1),
(2) Date: May 5, 2023

(87) PCT Pub. No.: WO2022/104299
PCT Pub. Date: May 19, 2022

(65) Prior Publication Data
US 2024/0005590 A1 Jan. 4, 2024

Related U.S. Application Data

(60) Provisional application No. 63/198,841, filed on Nov. 16, 2020.

(51) Int. Cl.
*G06T 15/20* (2011.01)
*G06T 15/04* (2011.01)
*G06T 15/55* (2011.01)

(52) U.S. Cl.
CPC .............. *G06T 15/20* (2013.01); *G06T 15/04* (2013.01); *G06T 15/55* (2013.01)

(58) Field of Classification Search
CPC ......... G06T 15/20; G06T 15/04; G06T 15/55; G06T 15/506; G06T 15/205; G06T 2207/20084; G06T 15/06
See application file for complete search history.

(56) References Cited

U.S. PATENT DOCUMENTS 8,666,119 B1 * 3/2014 Mallet ..................... G06T 19/00
382/103
10,818,071 B1 10/2020 Hoppe et al.
(Continued)

FOREIGN PATENT DOCUMENTS

EP 3576049 A2 12/2019

OTHER PUBLICATIONS

Lombardi, Stephen, et al. "Neural volumes: Learning dynamic renderable vols. from images." arXiv preprint arXiv:1906.07751 (2019). (Year: 2019).*

(Continued)

*Primary Examiner* — Kee M Tung
*Assistant Examiner* — Nauman U Ahmad
(74) *Attorney, Agent, or Firm* — Brake Hughes Bellermann LLP (57) ABSTRACT

Techniques of image synthesis using a neural radiance field (NeRF) includes generating a deformation model of movement experienced by a subject in a non-rigidly deforming scene. For example, when an image synthesis system uses NeRFs, the system takes as input multiple poses of subjects for training data. In contrast to conventional NeRFs, the technical solution first expresses the positions of the subjects from various perspectives in an observation frame. The technical solution then involves deriving a deformation (Continued)

model, i.e., a mapping between the observation frame and a canonical frame in which the subject's movements are taken into account. This mapping is accomplished using latent deformation codes for each pose that are determined using a multilayer perceptron (MLP). A NeRF is then derived from positions and casted ray directions in the canonical frame using another MLP. New poses for the subject may then be derived using the NeRF.

20 Claims, 6 Drawing Sheets

(56) References Cited

U.S. PATENT DOCUMENTS

| | | | | |
|---|---|---|---|---|
| 2002/0012454 A1* | 1/2002 | Liu | ................ | G06V 40/171 |
| | | | | 375/E7.263 |
| 2003/0076990 A1* | 4/2003 | Brand | ................ | G06T 7/251 |
| | | | | 382/293 |
| 2018/0307912 A1* | 10/2018 | Selinger | ................ | G06V 20/41 |
| 2021/0158561 A1* | 5/2021 | Park | ................ | G06T 7/74 |
| 2021/0350621 A1* | 11/2021 | Bailey | ................ | G06T 19/20 |

OTHER PUBLICATIONS

Mildenhall, Benjamin Joseph. "[ECCV 2020] NeRF: Neural Radiance Fields (10 Min Talk)." YouTube, YouTube, Aug. 4, 2020, www.youtube.com/watch?v=LRAqeM8EjOo. (Year: 2020).*

International Search Report and Written Opinion for PCT Application No. PCT/US2021/070032, mailed on Aug. 12, 2021, 12 pages.

Lombardi, et al., "Neural Volumes: Learning Dynamic Renderable Volumes From Images", ACM Trans. Graph., vol. 38, No. 4, Article 65, Jul. 12, 2019, 14 pages.

Mildenhall, et al., "NERF: Representing Scenes as Neural Radiance Fields for View Synthesis", arXiv:2003.08934v1; Cornell University Library, Mar. 19, 2020, 21 pages.

* cited by examiner

Acquire image data representing a plurality of images, each of the plurality of images including an image of a scene within an observation frame, the scene including a non-rigidly deforming object viewed from a respective perspective 310

Generate a deformation model based on the image data, the deformation model describing movements made by the non-rigidly deforming object while the image data was generated, the deformation model being represented by a mapping between a position in the observation frame to a position in a canonical frame 320

Generate a deformable neural radiance field (D-NeRF) based on positions and viewing directions of casted rays through the positions in the canonical frame, the D-NeRF providing a mapping between the positions and viewing directions to a color and optical density at each position in the observation frame, the color and optical density at each position in the observation frame enabling a viewing the non-rigidly deforming object from a new perspective 330

DEFORMABLE NEURAL RADIANCE FIELDS

CROSS REFERENCE TO RELATED APPLICATION

This application is a 35 U.S.C. § 371 National Phase Entry Application from PCT/US2021/070032, filed Jan. 14, 2021, designating the U.S., which claims priority to, U.S. Provisional Patent Application No. 63/198,841, filed Nov. 16, 2020, entitled "DEFORMABLE NEURAL RADIANCE FIELDS," the contents of which are incorporated herein by reference in their entireties.

TECHNICAL FIELD

This description relates to image synthesis using neural radiance fields (NeRFs).

BACKGROUND

Some computers configured to render computer graphic objects can render the objects at a specified view given multiple, existing views. For example, given several depth images and color images captured from cameras about a scene that includes such computer graphic objects, a goal may be to synthesize a new view of the scene from a different viewpoint. The scene can be either real, in which case the views are captured using physical color and depth sensors, or synthetic, in which case the views are captured using rendering algorithms such as rasterization. For a real scene, there exist many depth-sensing technologies, such as time-of-flight sensors, structured-light-based sensors, and stereo or multi-view stereo algorithms. Such technologies may involve visible or infrared sensors with passive or active illumination patterns, where the patterns may be temporally varying.

SUMMARY

In one general aspect, a method can include acquiring image data representing a plurality of images, each of the plurality of images including an image of a scene within an observation frame, the scene including a non-rigidly deforming object viewed from a respective perspective. The method can also include generating a deformation model based on the image data, the deformation model describing movements made by the non-rigidly deforming object while the image data was generated, the deformation model being represented by a mapping between a position in the observation frame to a position in a canonical frame. The method can further include generating a deformable neural radiance field (D-NeRF) based on positions and viewing directions of casted rays through the positions in the canonical frame, the D-NeRF providing a mapping between the positions and viewing directions to a color and optical density at each position in the observation frame, the color and optical density at each position in the observation frame enabling a viewing the non-rigidly deforming object from a new perspective.

In another general aspect, a computer program product comprising a nontransitive storage medium, the computer program product including code that, when executed by processing circuitry of a computing device, causes the processing circuitry to perform a method. The method can include acquiring image data representing a plurality of images, each of the plurality of images including an image of a scene within an observation frame, the scene including a non-rigidly deforming object viewed from a respective perspective. The method can also include generating a deformation model based on the image data, the deformation model describing movements made by the non-rigidly deforming object while the image data was generated, the deformation model being represented by a mapping between a position in the observation frame to a position in a canonical frame. The method can further include generating a deformable neural radiance field (D-NeRF) based on positions and viewing directions of casted rays through the positions in the canonical frame, the D-NeRF providing a mapping between the positions and viewing directions to a color and optical density at each position in the observation frame, the color and optical density at each position in the observation frame enabling a viewing the non-rigidly deforming object from a new perspective.

In another general aspect, an electronic apparatus comprises memory and controlling circuitry coupled to the memory. The controlling circuitry can be configured to acquire image data representing a plurality of images, each of the plurality of images including an image of a scene within an observation frame, the scene including a non-rigidly deforming object viewed from a respective perspective. The controlling circuitry can also be configured to generate a deformation model based on the image data, the deformation model describing movements made by the non-rigidly deforming object while the image data was generated, the deformation model being represented by a mapping between a position in the observation frame to a position in a canonical frame. The controlling circuitry can further be configured to generating a deformable neural radiance field (D-NeRF) based on positions and viewing directions of casted rays through the positions in the canonical frame, the D-NeRF providing a mapping between the positions and viewing directions to a color and optical density at each position in the observation frame, the color and optical density at each position in the observation frame enabling a viewing the non-rigidly deforming object from a new perspective.

The details of one or more implementations are set forth in the accompanying drawings and the description below. Other features will be apparent from the description and drawings, and from the claims.

DETAILED DESCRIPTION

Conventional approaches to synthesizing new views of a scene employ neural radiance fields (NeRFs). In this approach, one represents a static scene as a continuous five-dimensional function that outputs the radiance emitted in each direction (θ, φ) at each point (x, y, z) in space, and a density at each point which acts like a differential opacity controlling how much radiance is accumulated by a ray passing through (x, y, z). The approach optimizes a deep fully-connected neural network without any convolutional layers, often referred to as a multilayer perceptron (MLP), to represent the five-dimensional function by regressing from a single 5D coordinate (x, y, z, θ, φ) to a single volume density and view-dependent RGB color.

To render this five-dimensional function, or NeRF, one can: 1) march camera rays through the scene to generate a sampled set of 3D points, 2) use those points and their corresponding 2D viewing directions as input to the neural network to produce an output set of colors and densities, and 3) use classical volume rendering techniques to accumulate those colors and densities into a 2D image. Because this process is naturally differentiable, one can use gradient descent to optimize the NeRF by minimizing the error between each observed image and the corresponding views rendered from our representation. Minimizing this error across multiple views encourages the network to predict a coherent model of the scene by assigning high volume densities and accurate colors to the locations that contain the true underlying scene content.

NeRFs are generally good at synthesizing views in scenes involving rigid, inanimate objects. In contrast, NeRFs are less good at synthesizing views in scenes containing people and more generally, non-rigid objects that tend to move. A technical problem involves modeling people with hand-held cameras. This technical problem is challenging due to 1) nonrigidity—an inability to stay perfectly still, and 2) challenging materials like hair, glasses, and earrings that violate assumptions used in most reconstruction methods. For example, when a NeRF is used to synthesize views of a person taking pictures of themselves with a cell phone camera, i.e., a selfie, the synthesized views may have artifacts resulting from inaccuracies introduced by a NeRF unable to cope with the nonrigidity and challenging materials.

In contrast to the conventional approaches to solving the above-described technical problem, a technical solution to the above-described technical problem includes generating a deformation model of movement experienced by a subject in a non-rigidly deforming scene that defines how the subject is distorted by the movement. For example, when an image synthesis system uses NeRFs, the system takes as input multiple poses of subjects for training data. In contrast to conventional NeRFs, the technical solution first expresses the positions of the subjects from various perspectives in an observation frame. The technical solution then involves deriving a deformation model, i.e., a mapping between the observation frame and a canonical frame in which the subject's movements are taken into account. This mapping is accomplished using latent deformation codes for each pose that are determined using a multilayer perceptron (MLP). A NeRF is then derived from positions and casted ray directions in the canonical frame using another MLP. New poses for the subject may then be derived using the NeRF.

A technical advantage of the above-described technical solution is that the technical solution accurately predicts new, synthesized views of a scene without the artifacts introduced by failing to account for subject movement.

In some implementations, the deformation model is conditioned on a per-frame latent code, the latent code encoding a state of the scene in a frame.

In some implementations, the deformation model includes a rotation, a pivot point corresponding to the rotation, and a translation. In some implementations, the rotation is encoded as a pure log-quaternion. In some implementations, the deformation model includes a sum of (i) a similarity transformation on a difference between a position and the pivot point, (ii) the pivot point, and (iii) the translation.

In some implementations, the deformation model includes a multilayer perceptron (MLP) within a neural network. In some implementations, an elastic loss function component for the MLP is based on a norm of a matrix representing the deformation model. In some implementations, the matrix is a Jacobian of the deformation model with respect to the position in the observation frame. In some implementations, the elastic loss function component is based on a singular value decomposition of the matrix representing the deformation model. In some implementations, the elastic loss function component is based on a logarithm of the singular value matrix resulting from the singular value decomposition. In some implementations, the elastic loss function component is composed with a rational function to produce a robust elastic loss function.

In some implementations, a background loss function component involves designating points in the scene as static points that have a penalty for moving. In some implementations, wherein the background loss function component is based on a difference between a static point and a mapping of the static point in the observation frame to the canonical frame according to the deformation model. In some implementations, generating the deformation model includes applying a positional encoding to a position coordinate within the scene to produce a periodic function of position, the periodic function having a frequency that increases with training iteration for the MLP. In some implementations, the periodic function of the positional encoding is multiplied by a weight indicating whether a training iteration includes a particular frequency.

A NeRF is a continuous, volumetric representation. It is a function F: (x, d)→(c, σ) which maps a 3D position x=(x, y, z) and viewing direction d=(φ, θ) to an RGB color c=(r, g, b) and density σ. Coupled with volume rendering techniques, NeRFs can represent scenes with photo-realistic quality. For this reason, NeRF is built upon to tackle the problem of photo-realistic human capture.

The NeRF training procedure relies on the fact that the given a 3D scene, two intersecting rays from two different cameras should yield the same color. Disregarding specular reflection and transmission, this assumption is true for all scenes with static structure. Unfortunately, it has been found that people do not possess the ability to stay still. This may be verified as follows: when one attempts to take a selfie video while staying completely still, it will be found that one's gaze naturally follows the camera, and that even parts one thinks are still are instead moving relative to the background.

With the understanding of this limitation, NeRF is extended to allow the reconstruction of non-rigidly deforming scenes. Instead of directly casting rays through a NeRF, it is used as a canonical template of the scene. This template contains the relative structure and appearance of the scene while a rendering will use a non-rigidly transformed version of the template. Others may also model a template and a per-frame deformation, but the deformation is defined on mesh points and on a voxel grid respectively, whereas it is modeled as a continuous function using an MLP.

An observation-to-canonical deformation is employed for every frame $i \in \{1, \ldots, n\}$, where n is the number of observed frames. This defines a mapping $T_i: x \to x'$ that maps all observation-space coordinates x to a canonical-space coordinate x'. In practice, the deformation fields are modeled for all time steps using a single MLP T: $(x, \omega_i) \to x'$, which is conditioned on a per-frame learned latent code $\omega_i$. The per-frame latent codes model the state of the scene in that frame. Given a canonical-space radiance field F and an observation-to-canonical mapping T, the observation-space radiance field can be evaluated as $$G(x,d,\omega_i)=F(T(x,\omega_i),d). \quad (1)$$

When rendering, rays and sample points are simply cast in the observation frame and then the deformation field is used to map the sampled points to points on the template.

Figure 1:
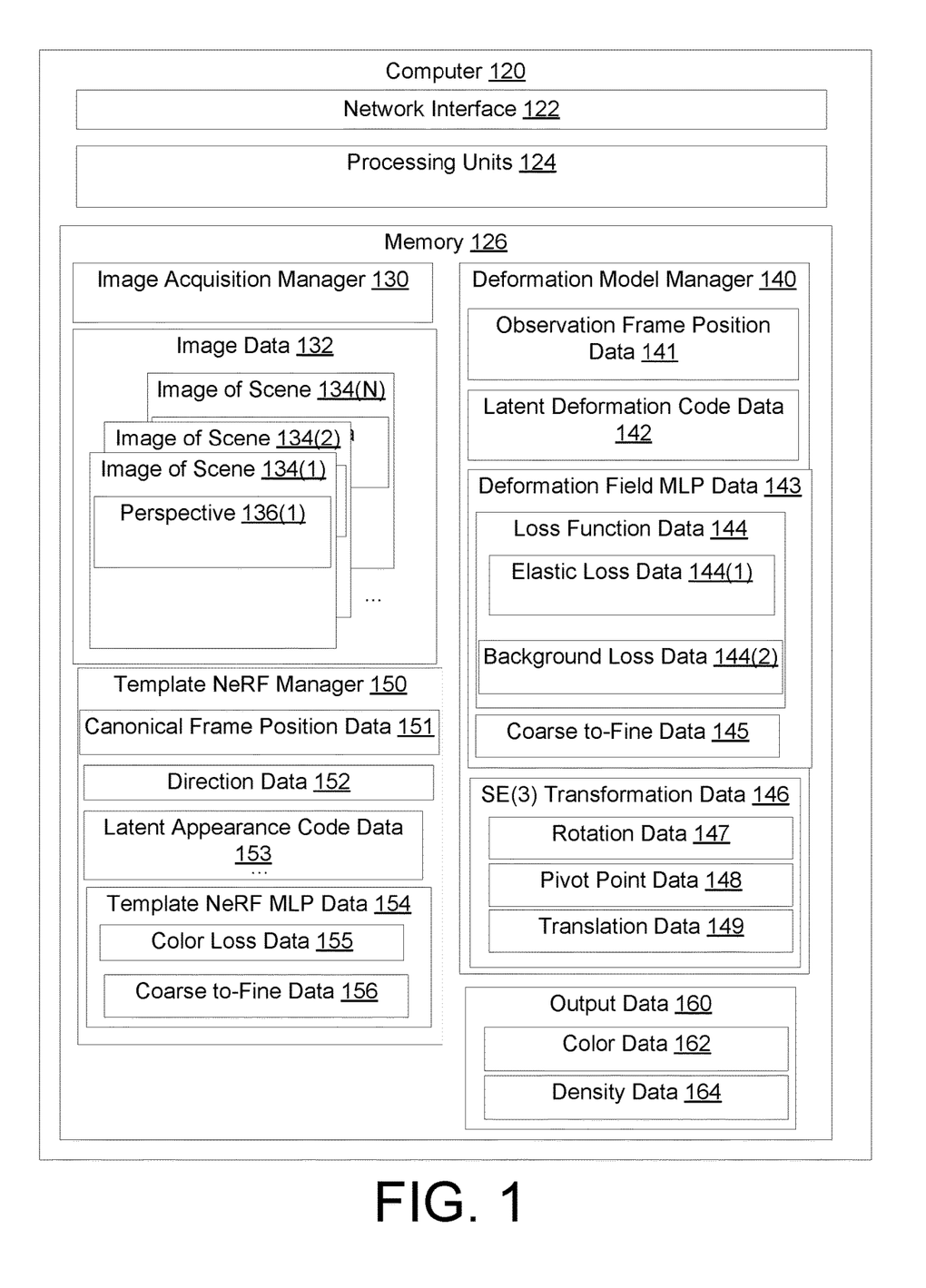
FIG. 1 is a diagram that illustrates an example electronic environment for implementing the technical solution described herein.

FIG. 1 is a diagram that illustrates an example electronic environment 100 in which the above-described improved techniques may be implemented. As shown in FIG. 1, the example electronic environment 100 includes a computer 120.

The computer 120 includes a network interface 122, one or more processing units 124, and memory 126. The network interface 122 includes, for example, Ethernet adaptors, and the like, for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can include processors (e.g., processing units 124) configured to process instructions stored in the memory 126. Examples of such instructions as depicted in FIG. 1 include an image acquisition manager 130, a deformation model manager 140, and a template NeRF manager 150. Further, as illustrated in FIG. 1, the memory 126 is configured to store various data, which is described with respect to the respective managers that use such data.

The image acquisition manager 130 is configured to acquire image data 132 for input into the deformation model manager 140. In some implementations, the image acquisition manager 130 receives the image data 132 over the network interface 122, i.e., over a network. In some implementations, the image acquisition manager 130 receives the image data 132 from local storage (e.g., a disk drive, flash drive, SSD, or the like).

The image data 132 represents multiple images of scenes 134(1), 134(2), . . . , 134(N). For example. a user may generate the images 134(1), 134(2), . . . , 134(N) by recording images of themselves using a mobile phone camera, i.e., "selfies," from different perspectives 136(1), 136(2), . . . , 136(N).

Modeling people with hand-held cameras is especially challenging due both to 1) nonrigidity—an inability to stay perfectly still, and 2) challenging materials like hair, glasses, and earrings that violate assumptions used in most reconstruction methods. To model non-rigidly deforming scenes, NeRF may be generalized by introducing an additional component: a canonical NeRF model serving as a template for all the observations, supplemented by a deformation field for each observation that warps 3D points in the frame of reference of an observation into the frame of reference of the canonical model.

The deformation model manager 140 is configured to generate a deformation model that provides a mapping between coordinates in an observation space of the scene and a canonical space in which the NeRF model is applied. To this effect, the deformation model manager 140 is configured to generate observation frame position data 141 and latent deformation code data 142.

The observation frame data 141 represents coordinates of points in the observation frame, i.e., the coordinate frame of the images 134(1), 134(2), . . . , 134(N). For example, the observation frame data 141 may represent points x in a volume representing an extent of the space in which the image data 132 was generated. The observation frame may be visualized in FIG. 2.

Figure 2:
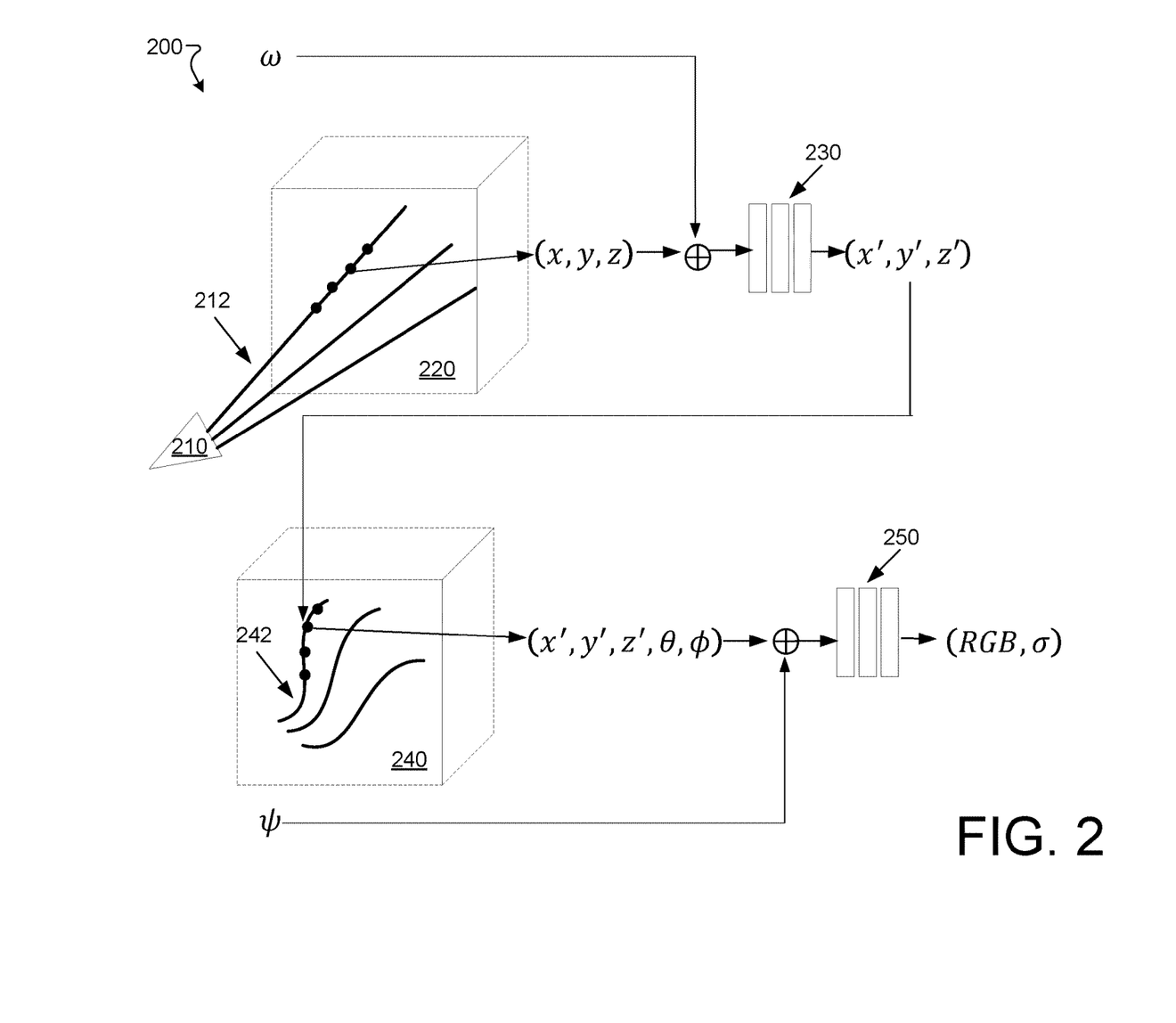
FIG. 2 is a diagram that illustrates an example system architecture for generating deformable neural radiance fields within the electronic environment shown in FIG. 1.

FIG. 2 is a diagram that illustrates an example system architecture 200 for generating deformable neural radiance fields. FIG. 2 shows an observation frame 220 as a collection of points in a three-dimensional volume. FIG. 2 also shows a camera perspective 210 by which light rays 212 are directed.

The latent deformation code data 142 represents a latent deformation code, shown represented by the symbol w in FIG. 2. Each image 134(1), . . . , 134(N) is associated with its own latent deformation code. A per-image latent deformation code associated with an image of a scene models the state of the scene in that image. In some implementations, per-image latent deformation codes are learned. Each per-image latent deformation code has a low number of dimensions; in some implementation, each latent deformation code has eight dimensions.

The deformation model manager 140 is also configured to generate the deformation model based on the observation frame data 141 and the latent deformation code data 142. In some implementations, the deformation model is derived using a neural network. In some implementations, the neural network includes no convolutional layers. As shown in FIG. 2, the deformation model is derived using a multiplayer perceptron (MLP) 230. As shown in FIG. 1, the deformation model is derived using deformation field MLP data 143.

The deformation field MLP data 143 represents values that define the deformation field MLP. An example deformation field MLP in the context of the technical solution describe herein has six layers (one input, one output, and four hidden layers). In this example, the size (i.e., number of nodes) of the hidden layer is 128, there is a skip connection at the fourth layer, and a Softplus activation function log $(1+e^x)$. The deformation field MLP data 143 further includes loss function data 144 and coarse-to-fine data 145.

The deformation model adds ambiguities that can make optimization more challenging. For example, an object moving backwards is visually equivalent to the object shrinking in size, with infinitely many solutions in between. These ambiguities lead to an under-constrained optimization problem which yields implausible deformations and artifacts. Accordingly, priors are introduced that lead to a more plausible solution.

Loss function data 144 represents loss function components used to determine the values of the nodes of the deformation field MLP (i.e., MLP 230 in FIG. 2) for each training iteration. As shown in FIG. 2, the loss function components for MLP 230 include elastic loss data 144(1) and background loss data 144(2).

The elastic loss data 144(1) represents values of an elastic loss function used to determine the deformation model. It is common in geometry processing and physics simulation to model non-rigid deformations using elastic energies measuring the deviation of local deformations from a rigid motion. Such energies have been extensively used for the reconstruction and tracking of non-rigid scenes and objects; accordingly, elastic energies are good candidates for such an approach. While elastic energies have been most commonly used for discretized surfaces, e.g., meshes, a similar concept can be applied in the context of a continuous deformation field included in the deformation model For a fixed latent code $\omega_i$, a continuous deformation field T is a non-linear mapping from observation-coordinates in $\mathbb{R}^3$ to canonical coordinates in $\mathbb{R}^3$. Nevertheless, such a non-linear mapping may be approximated with a matrix representation.

In some implementations, the non-linear mapping is also differentiable. In this case, the Jacobian $J_T(x)$ of this non-linear mapping at a point $x \in \mathbb{R}^3$ describes a good linear approximation of the transformation at that point. Accordingly, the local behavior of the deformation model can be controlled through the Jacobian of T. Note that unlike other approaches using discretized surfaces, this continuous/differentiable formulation allows for directly computing the Jacobian of this mapping through automatic differentiation of the deformation field MLP.

There are several ways to penalize the deviation of the Jacobian $J_T$ from a rigid transformation. Considering the singular-value decomposition of the Jacobian $J_T = U\Sigma V^T$, multiple approaches penalize the deviation from the closest rotation as $\|J_T - R\|_F^2$, where $R = VU^T$ and $\bullet_F$ is the Frobenius norm. In some implementations, the elastic loss component is based on the singular values of $J_T$; the elastic loss component includes a measure of a deviation of the singular value matrix $\Sigma$ from the identity I. The log of the singular values gives equal weight to a contraction and expansion of the same factor, and it was found to perform better. Accordingly, the elastic loss component at a point $x_i$ derived from the deviation of log singular values from zero is penalized as follows:

$$L_{elastic}(x_i) = \|\log \Sigma - \log I\|_F^2 = \|\log \Sigma\|_F^2, \quad (2)$$

where log denotes a matrix logarithm.

In some implementations, the elastic loss component is remapped to a more robust loss function. For example, although humans are mostly rigid, there are some movements which can break our assumption of local rigidity e.g., facial expressions which locally stretch and compress our skin. The elastic energy defined above may then be remapped using a robust loss component:

$$L_{elastic-r}(x_i) = w_i \rho(\|\log \Sigma_F\|, c), \quad (3)$$

$$\rho(x, c) = \frac{2(x/c)^2}{(x/c)^2 + 4}. \quad (4)$$

where $\rho(\bullet)$ is a Geman-McClure robust error function implemented with hyperparameter $c=0.03$ and $w_i$ is a weight. Over multiple points, the net robust loss component $L_{elastic-r}$ is a weighted average of the robust loss component at each of those multiple points. The robust loss component causes the gradients of the loss to fall off to zero for large values of the argument, reducing the influence of outliers during training.

The background loss data 144(2) represents values of a background loss function used to determine the deformation model. The deformation field T is unconstrained and therefore everything is free to move around. In some implementations, a regularization term is added which prevents the background from moving. Given a set of three-dimensional points in the scene which are known to be static, one can penalize any deformations at these points. For example, camera registration using structure from motion produces a set of 3D feature points that behave rigidly across at least some set of observations. Given these static 3D points $\{x_1, \ldots, x_K\}$, one penalizes movement as $$L_{bg} = \frac{1}{K} \sum_{k=1}^{K} \|T(x_k) - x_k\|_2. \quad (5)$$

In addition to keeping the background points from moving, this regularization also has the benefit of aligning the observation coordinate frame to the canonical coordinate frame.

Coarse-to-fine data 145 represents a coarse-to-fine deformation regularization. A core component of the NeRF architecture is positional encoding. A similar concept is employed for the deformation field MLP; a function $\gamma: \mathbb{R}^3 \to \mathbb{R}^{3+6m}$ defined as $\gamma(x) = (x, \ldots, \sin(2^k \pi x), \cos(2^k \pi x), \ldots)$ is used with $k \in \{0, \ldots, m-1\}$. This function projects a positional vector $x \in \mathbb{R}^3$ in a high dimensional space using a set of sine and cosine functions of increasing frequencies. The hyper-parameter m controls the number of frequency bands (and therefore the highest frequency) used in the mapping. This has been shown to control the smoothness of the network: A higher value of m allows higher frequency details to be modeled, but also may result in NeRF over-fitting and modeling image noise as 3D structure.

It is observed that jointly optimizing a NeRF together with a deformation field leads to an optimization problem that is prone to local minima. Early in training, neither the NeRF nor the deformation field contain meaningful information. If one uses a large value for m, this means that the deformation field can over-fit to an incomplete NeRF template. For example, if a subject rotates their head sideways, a network using a large m would often choose to keep the head in the forward position and encode changes of appearance using the view direction component of NeRF. On the other hand, if one uses a small value for m, the network will be unable to model deformations which require high frequency details such as facial expressions or moving strands of hair.

It has been shown that the positional encoding used in NeRF has a convenient interpretation in terms of the neural tangent kernel (NTK) of NeRF's MLP: results in a stationary interpolating kernel where m controls a tunable "bandwidth" of that interpolating kernel. A small number of frequencies induces a wide kernel which causes under-fitting of the data, while a large number of frequencies induces a narrow kernel causing over-fitting of the data. With this in mind, a method to smoothly anneal the bandwidth of the NTK is proposed by introducing a parameter $\alpha$ that windows the frequency bands of the positional encoding. The weight is defined for each frequency band j of the positional encoding as $$a_j(\alpha) = \frac{(1 - \cos(\pi \min(\max(0, \alpha - j), 1)))}{2}, \quad (6)$$

where linearly annealing the parameter $\alpha \in [0, m]$ can be interpreted as sliding a truncated Hann window (where the left side is clamped to 1 and the right side is clamped to 0) across the frequency bands. The positional encoding is then defined as $\gamma_\alpha(x)=(x, \ldots, \alpha_k(\alpha)\sin(2^k\pi x), \alpha_k(\alpha)\cos(2^k\pi x), \ldots)$. During training, $$\alpha(t) = \frac{mt}{N},$$

where t is the current training iteration, and N is a hyperparameter for when $\alpha$ should reach the maximum number of frequencies m.

The simplest version of the deformation uses a translational vector field V: $(x, \omega_i) \to t$, defining the deformation as $T(x, \omega_i)=x+V(x, \omega_i)$. This formulation is sufficient to represent all continuous deformations. However, rotating a group of points with a translation field requires a different translation for each point, making it difficult to rotate chunks of the scene simultaneously. Therefore the deformation is formulated using a dense SE(3) field W: $(x, \omega_i) \to SE(3)$. An SE(3) transform encodes rigid motion, allowing one to rotate a set of distant points with the same parameters. An SE(3) transform is encoded as a rotation q with pivot point s followed by a translation t. The rotation is encoded as a pure log-quaternion $p=(0, v)$ whose exponent is guaranteed to be a unit quaternion and hence a valid rotation:

$$q = \exp(p) = \begin{pmatrix} \cos\|v\| \\ \frac{v}{\|v\|} \sin\|v\| \end{pmatrix}. \quad (7)$$

Note that this can also be seen as an axis-angle representation where $v/\|v\|$ is the unit axis of rotation and $2\|v\|$ is the angle of rotation. The deformation using the SE(3) transformation is then given by a similarity transformation of a position with respect to the pivot point s:

$$x'=q(x-s)q^{-1}+s+t. \quad (8)$$

The transformation field is encoded in an MLP $$W:(x,\omega_i) \to (v,s,t), \quad (9)$$

using an architecture similar to that used by the template NeRF manager 150. The transformation of every state i is represented by conditioning on a latent code $\omega_i$. The latent code is optimized through an embedding layer. An important property of the log-quaternion is that exp(0) is the identity transform. Therefore the weights of the last layer of the MLP are initialized from $\mathcal{U}(-10^{-5}, 10^{-5})$ to initialize the deformation near the identity.

Along these lines, the deformation field MLP data 143 also includes SE(3) transformation data 146. The SE(3) transformation data 146 represents the transformation field as encoded in the MLP and described above. The SE(3) transformation data 146 includes rotation data 147 representing the rotation q, pivot point data 148 representing the pivot point s, and translation data representing the translation t. In some implementations, the rotation data 147, the pivot point data 148, and the translation data 149 are represented in quaternion form. In some implementations, the rotation data 147, the pivot point data 148, and the translation data 149 are represented in another form, e.g., matrix form.

The template NeRF manager 150 is configured to generate a five-dimensional representation of the canonical frame F: $(x, d) \to (c, \sigma)$ which maps a 3D position $x=(x, y, z)$ and viewing direction $d=(\phi, \theta)$ to an RGB color $c=(r, g, b)$ and density $\sigma$. In some implementations, an appearance code $\psi_i$ is provided for each image to modulate the color output to handle appearance variations between input frames, e.g., exposure and white balance. As shown in FIG. 2, the canonical frame 240 is visualized. The points along the ray 212 in the observation frame 220 has mapped to points along a curve 242 in the canonical frame 240 using the deformation field MLP 230. Each position and a ray/camera perspective are mapped, along with an appearance code, to a color and density via NeRF MLP 250.

As shown in FIG. 1, the template NeRF manager 150 is configured to generate canonical frame position data 151, direction data 152, latent appearance code data 153, and template NeRF MLP data 154 to output data 160, including color data 162 and density data 163. The canonical frame position data 152 represents the positions in the canonical frame mapped from the observation frame using the deformation field MLP (e.g., MLP 230 in FIG. 2). The direction data 152 represents ray or camera angles or direction cosines through each point in the canonical frame. The latent appearance code data 153 represents latent appearance codes for each image.

The template NeRF MLP data 154 represents the represents values that define the NeRF MLP. An example NeRF MLP in the context of the technical solution describe herein has six layers (one input, one output, and four hidden layers). In this example, the size (i.e., number of nodes) of the hidden layer is 128, there is a skip connection at the fourth layer, and a ReLU activation function. The deformation field MLP data 154 further includes color loss function data 155 and coarse-to-fine data 156.

The color loss function data 155 represents values of a color loss function, defined as follows. At each optimization iteration, a batch of camera rays is randomly sampled from the set of all pixels in the dataset; then the hierarchical sampling to query $N_c$ samples from a coarse network and $N_c+N_f$ samples from a fine network is followed. A volume rendering procedure is used to render the color of each ray from both sets of samples. The color loss is the total squared error between the rendered and true pixel colors for both the coarse and fine renderings:

$$L_{rgb} = \sum_{r \in \mathcal{R}} \left( \|\hat{C}_c(r) - C(r)\|_2^2 + \|\hat{C}_f(r) - C(r)\|_2^2 \right), \quad (10)$$

where $\mathcal{R}$ is the set of rays in a batch, and $C(r)$, $\hat{C}_c(r)$, and $\hat{C}_f(r)$ are the ground truth, coarse volume predicted, and fine volume predicted RGB colors, respectively.

The coarse-to-fine data 156 represents a coarse-to-fine deformation regularization, similar to coarse-to-fine data 145. For the NeRF MLP, however, the sines and cosines are not weighted.

Returning to the elastic loss function, the deformation field T is allowed to behave freely in empty space, since the subject moving relative to the background requires a non-rigid deformation somewhere in space. Therefore, in some implementations, the elastic loss function is weighted at each point by its contribution to rendered views as follows.

A five-dimensional neural radiance field represents a scene as the volume density and directional emitted radiance at any point in space. The color of any ray passing through the scene is rendered using principles from classical volume rendering. The volume density $\sigma(x)$ can be interpreted as the differential probability of a ray terminating at an infinitesimal particle at location x. The expected color C(r) of camera ray r(t)=o+td with near and far bounds $t_n$ and $t_f$ is $$C(r)=\int_{t_n}^{t_f} T(t)\sigma(r(t))c(r(t),d)dt, \quad (11)$$

where $$T(t)=\exp(-\int_{t_n}^{t} \sigma(r(s))ds). \quad (12)$$

The function T(t) denotes the accumulated transmittance along the ray from $t_n$ to t, i.e., the probability that the ray travels from $t_n$ to t without hitting any other particle. Rendering a view from our continuous neural radiance field requires estimating this integral C(r) for a camera ray traced through each pixel of the desired virtual camera.

This continuous integral is numerically estimated using quadrature. Deterministic quadrature, which is typically used for rendering discretized voxel grids, would effectively limit our representation's resolution because the MLP would only be queried at a fixed discrete set of locations. Instead, we use a stratified sampling approach where we partition [$t_n$, $t_f$] into M evenly-spaced bins and then draw one sample uniformly at random from within each bin:

$$t_i \sim \mathcal{U}\left[t_n + \frac{i-1}{M}(t_f - t_n),\ t_n + \frac{i}{M}(t_f - t_n)\right]. \quad (13)$$

Although a discrete set of samples is used to estimate the integral, stratified sampling enables a representation of a continuous scene because the stratified sampling results in the MLP being evaluated at continuous positions over the course of optimization. We use these samples to estimate C(r) as follows:

$$\hat{C}(r) = \sum_{i=1}^{M} T_i(1 - \exp(-\sigma_i \delta_i))c_i, \quad (14)$$

where $$T_i = \exp\left(-\sum_{j=1}^{i-1} \sigma_j \delta_j\right), \quad (15)$$

$\delta_i = t_{i+1} - t_i$ is the distance between adjacent samples, and $c_i = c(r(t_i), d)$.

The rendering strategy of densely evaluating the neural radiance field network at M query points along each camera ray is inefficient: free space and occluded regions that do not contribute to the rendered image are still sampled repeatedly. Accordingly, instead of just using a single network to represent the scene, two networks are simultaneously optimized: one "coarse" and one "fine". First, a set of $N_c$ locations is sampled using stratified sampling and evaluate the "coarse" network at these locations as described in Eqs. (13), (14), and (15). Given the output of this "coarse" network, a more informed sampling of points is produced along each ray where samples are biased towards the relevant parts of the volume. To do this, first rewrite the alpha composited color is rewritten from the coarse network $\hat{C}_c(r)$ in Eq. (14) as a weighted sum of all sampled colors $c_i$ along the ray:

$$\hat{C}_c(r) = \sum_{i=1}^{N_c} w_i c_i, \quad (16)$$

where $$w_i = T_i(1-\exp(-\sigma_i \delta_i)). \quad (17)$$

The output data 160 represents the output of the NeRF MLP (i.e., MLP 250 in FIG. 2). The output data 160 includes color data 162 and density data 164. As shown above (e.g., Eq. (11)), the color data 162 depends on position and ray angle while the density data 164 depends only on ray angle. From the color data 162 and density data 164, one may obtain a view of the scene from any perspective.

The system 200 shown in FIG. 2 may be optimized as a unit, i.e., the MLP 230 and MLP 250 may be identified with a single loss function, which is a sum of the loss components described above:

$$L = L_{rgb} + \lambda L_{elastic-r} + \mu L_{bg} \quad (18)$$

where $\lambda$ and $\mu$ are weights. In some implementations, $\lambda = \mu = 10^{-3}$.

Figure 3:
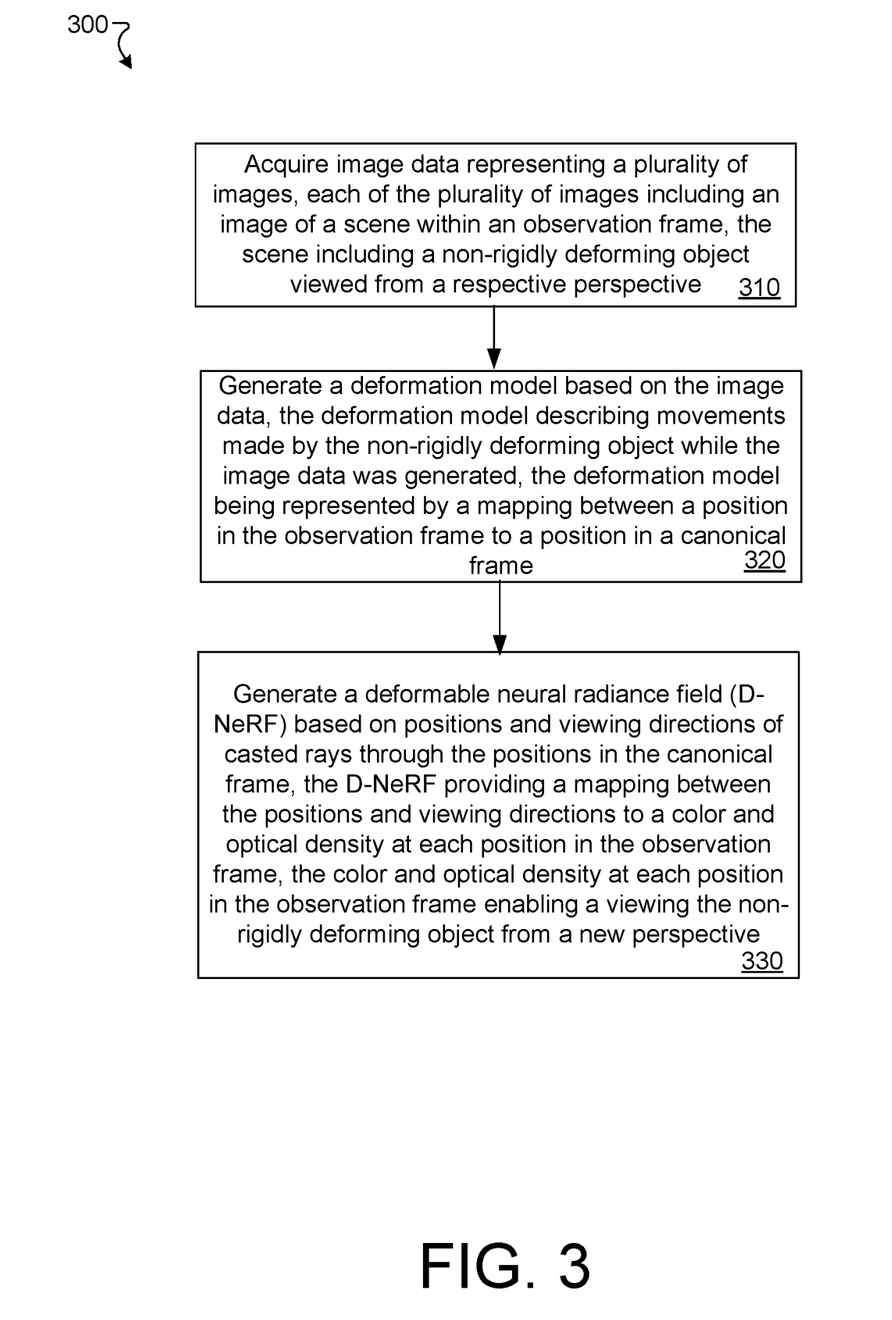
FIG. 3 is a flow chart that illustrates an example method of performing the technical solution within the electronic environment shown in FIG. 1.

FIG. 3 is a flow chart depicting an example method 300 of generating a deformable NeRF. The method 300 may be performed by software constructs described in connection with FIG. 1, which reside in memory 126 of the computer 120 and are run by the set of processing units 124 or may be performed by software constructs which reside in memory of a computing device different from (e.g., remote from) computer 120.

At 310, the image acquisition manager 130 acquires image data (e.g., image data 132) representing a plurality of images (e.g., images 134(1), . . . , 134(N)), each of the plurality of images including an image of a scene within an observation frame (e.g., observation frame position data 141), the scene including a non-rigidly deforming object viewed from a respective perspective (e.g., perspectives 136(1), . . . , 136(N));

At 320, the deformation model manager 140 generates a deformation model (e.g., deformation field MLP data 143) based on the image data, the deformation model describing movements made by the non-rigidly deforming object while the image data was generated, the deformation model being represented by a mapping between a position in the observation frame to a position in a canonical frame (e.g., canonical frame position data 151); and At 330, the template NeRF manager 150 generates a deformable neural radiance field (D-NeRF) based on positions and viewing directions of casted rays through the positions in the canonical frame, the D-NeRF providing a mapping between the positions and viewing directions to a color (e.g., color data 162) and optical density (e.g., density data 164) at each position in the observation frame, the color and optical density at each position in the observation frame enabling a viewing the non-rigidly deforming object from a new perspective.

Figure 4A:
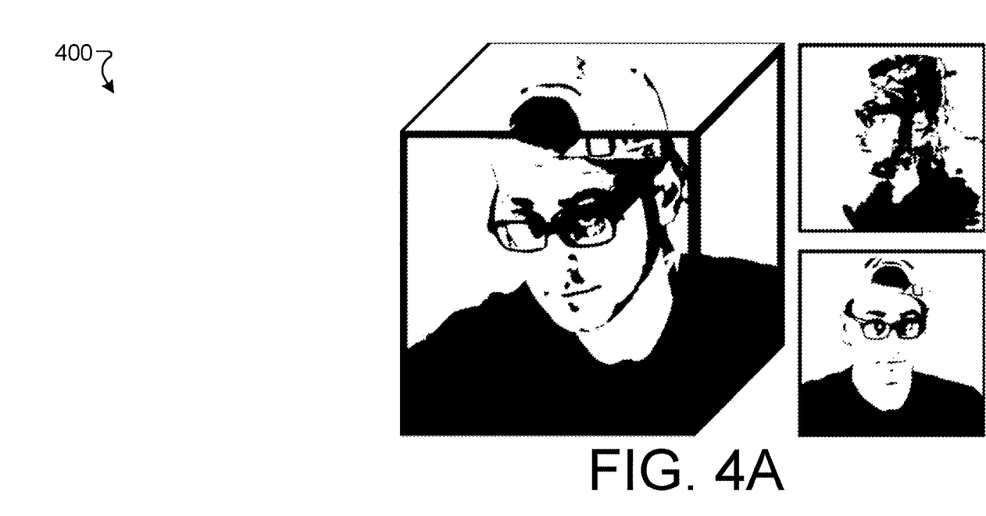
FIG. 4A is a diagram that illustrates an example pose of a human subject in an observation frame.
Figure 4B:
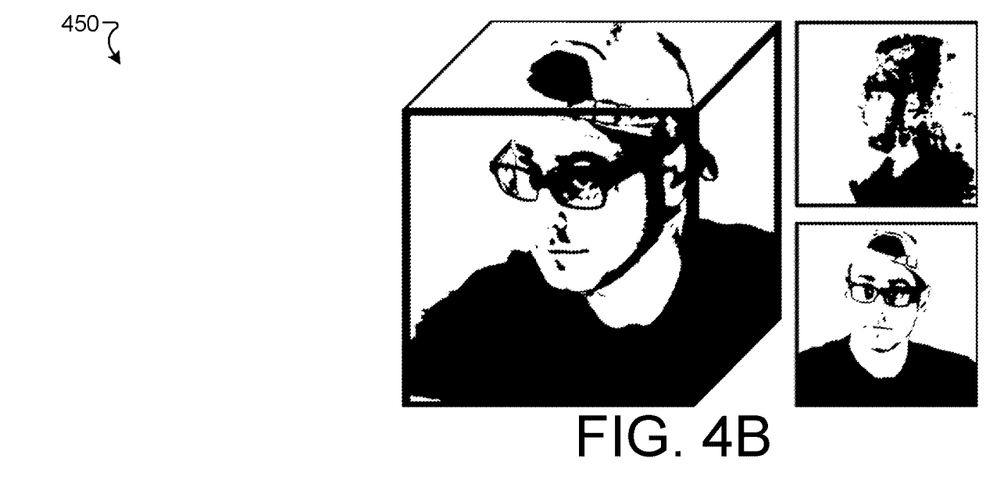
FIG. 4B is a diagram that illustrates an example pose of a human subject in a canonical frame.
Figure 4C:
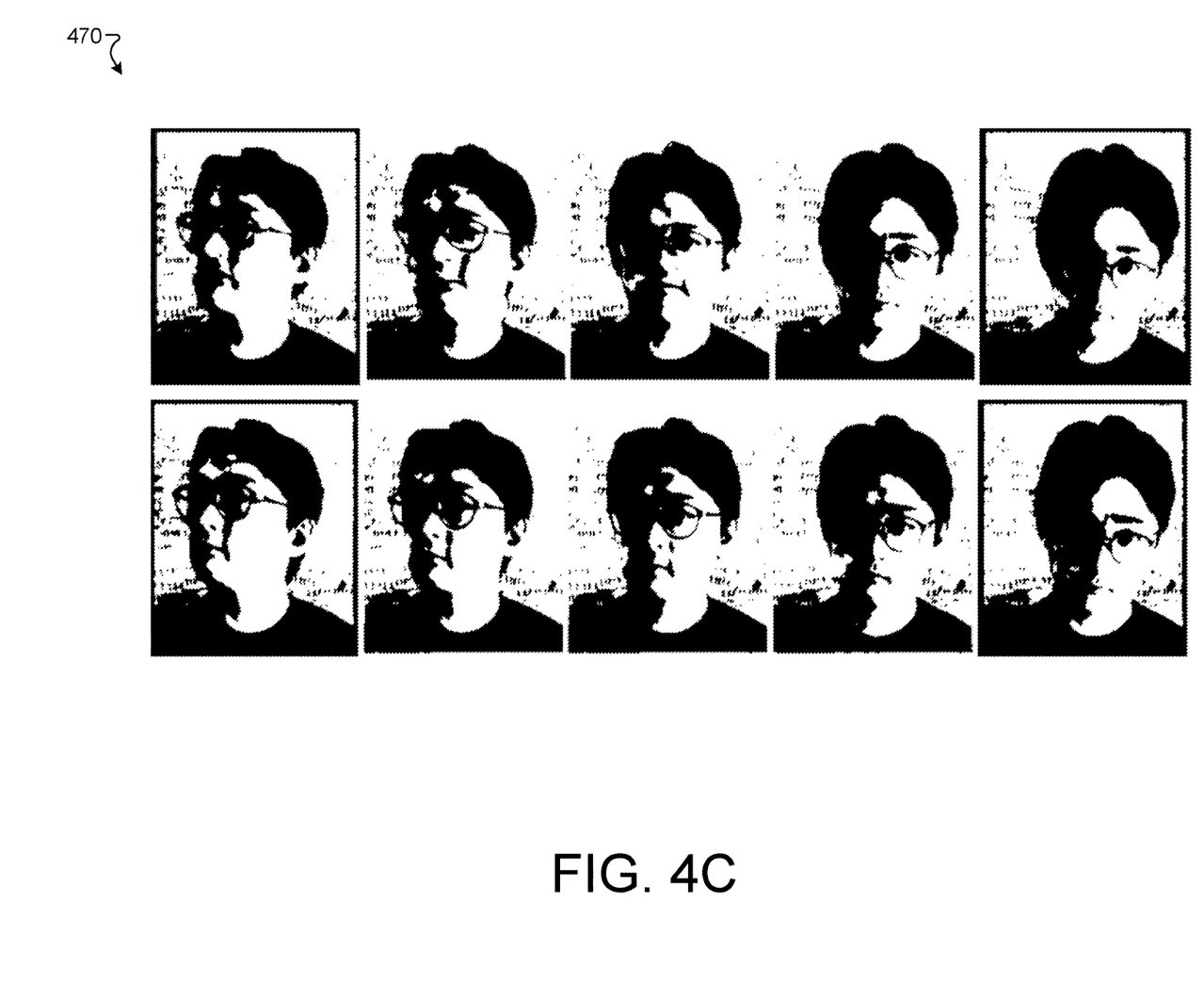
FIG. 4C is a is a diagram that illustrates example interpolations between keyframes without (top) and with (bottom) elastic regularization.

The effect of the deformation field on a subject is illustrated in FIGS. 4A, 4B, and 4C. FIG. 4A is a diagram that illustrates an example pose 400 of a human subject in an observation frame. FIG. 4B is a diagram that illustrates an example pose 450 of a human subject in a canonical frame. In both FIGS. 4A and 4B, the subjects are shown with insets showing orthographic views in the forward and left directions. In FIG. 4A (the observation frame), note the right-to-left and front-to-back displacements between the observation and canonical model, which are modeled by the deformation field for this observation.

FIG. 4C is a is a diagram that illustrates example interpolations 470 between keyframes (outlined) without (top) and with (bottom) elastic regularization. FIG. 4C shows novel views synthesized without and with elastic regularization by linearly interpolating observation deformation codes. Without elastic regularization, intermediate states show distortions, e.g., distances between facial features are changed from the original image.

Figure 5:
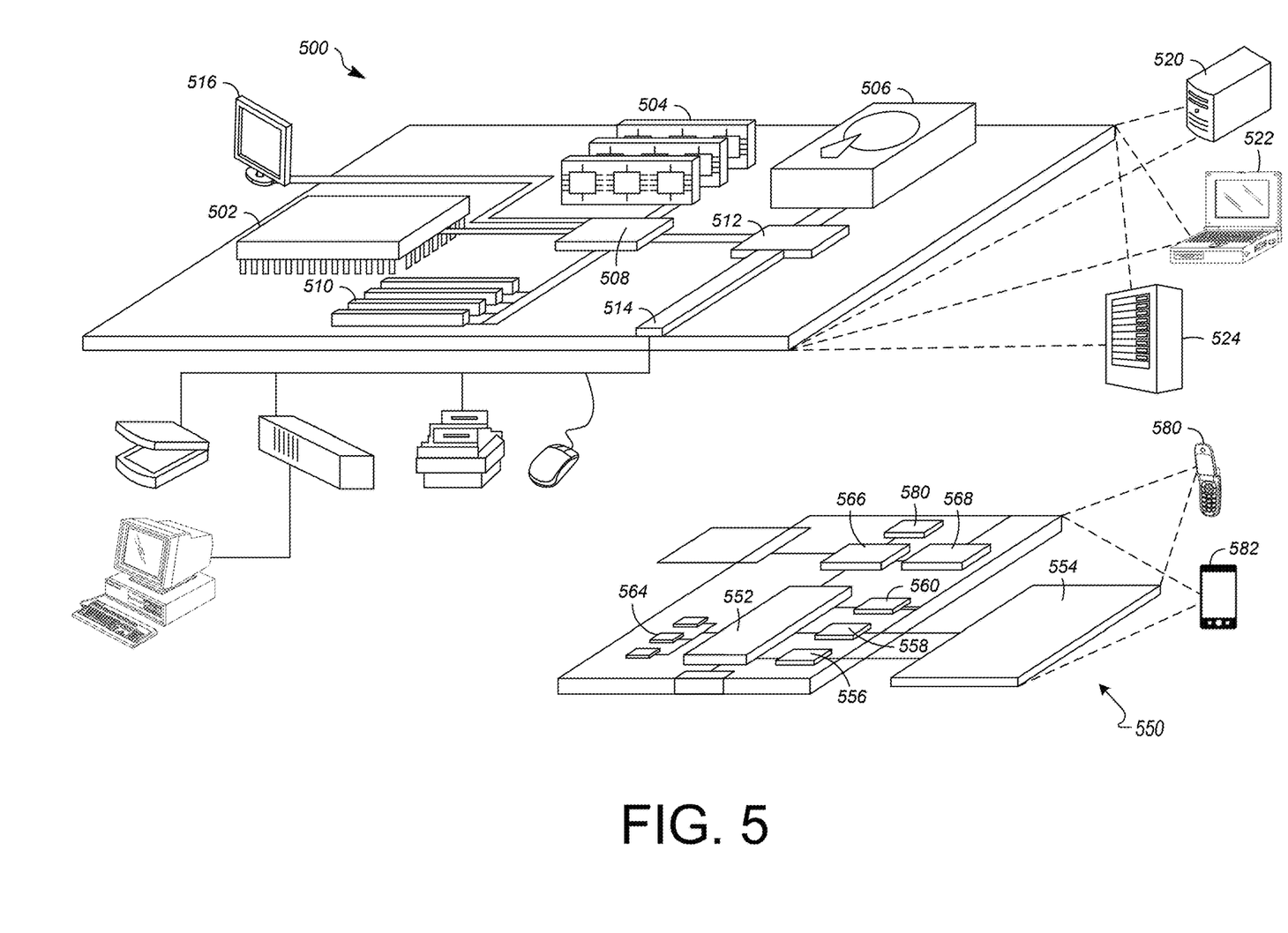
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer-or machine-readable medium, such as the memory 564, or memory on processor 552, that may be received, for example, over transceiver 568.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown).

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the image acquisition manager 130 (and/or a portion thereof), the deformation model manager 140 (and/or a portion thereof), and the template NeRF manager 150 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
acquiring image data representing a plurality of images, each of the plurality of images including an image of a scene within an observation frame, the scene including a non-rigidly deforming object viewed from a respective perspective;
generating a deformation model based on the image data, the deformation model describing movements made by the non-rigidly deforming object while the image data was generated, the deformation model being represented by a differentiable non-linear mapping between a position in the observation frame to a position in a canonical frame; and
generating a neural radiance field based on positions and viewing directions of casted rays through the positions in the canonical frame, the neural radiance field providing a mapping between the positions and viewing directions to a color and optical density at each position in the observation frame, the color and optical density at each position in the observation frame enabling a viewing of the non-rigidly deforming object from a new perspective.

2. The method as in claim 1, wherein the deformation model is conditioned on a latent code, the latent code encoding a state of the scene in a frame.

3. The method as in claim 1, wherein the deformation model includes a rotation, a pivot point corresponding to the rotation, and a translation.

4. The method as in claim 3, wherein the rotation is encoded as a pure log-quaternion.

5. The method as in claim 3, wherein the deformation model includes a sum of (i) a similarity transformation on a difference between a position and the pivot point, (ii) the pivot point, and (iii) the translation.

6. The method as in claim 1, wherein the deformation model includes a multilayer perceptron (MLP) within a neural network.

7. The method as in claim 6, wherein an elastic loss function component for the MLP is based on a norm of a matrix representing the deformation model.

8. The method as in claim 7, wherein the matrix is a Jacobian of the deformation model with respect to the position in the observation frame.

9. The method as in claim 7, wherein the elastic loss function component is based on a singular value decomposition of the matrix representing the deformation model.

10. The method as in claim 9, wherein the elastic loss function component is based on a logarithm of a singular value matrix resulting from the singular value decomposition.

11. The method as in claim 7, wherein the elastic loss function component is composed with a rational function to produce a robust elastic loss function.

12. The method as in claim 6, wherein a background loss function component involves designating points in the scene as static points that have a penalty for moving.

13. The method as in claim 12, wherein the background loss function component is based on a difference between a static point and a mapping of the static point in the observation frame to the canonical frame according to the deformation model.

14. The method as in claim 6, wherein generating the deformation model includes:
applying a positional encoding to a position coordinate within the scene to produce a periodic function of position, the periodic function having a frequency that increases with training iteration for the MLP.

15. The method as in claim 14, wherein the periodic function of the positional encoding is multiplied by a weight indicating whether a training iteration includes a particular frequency.

16. A computer program product comprising a nontransitive storage medium, the computer program product including code that, when executed by processing circuitry of a computing device, causes the processing circuitry to perform a method, the method comprising:
acquiring image data representing a plurality of images, each of the plurality of images including an image of a scene within an observation frame, the scene including a non-rigidly deforming object viewed from a respective perspective;
generating a deformation model based on the image data, the deformation model describing movements made by the non-rigidly deforming object while the image data was generated, the deformation model being represented by a differentiable non-linear mapping between a position in the observation frame to a position in a canonical frame; and
generating a neural radiance field based on positions and viewing directions of casted rays through the positions in the canonical frame, the neural radiance field providing a mapping between the positions and viewing directions to a color and optical density at each position in the observation frame, the color and optical density at each position in the observation frame enabling a viewing of the non-rigidly deforming object from a new perspective.

17. The computer program product as in claim 16, wherein the deformation model includes a multilayer perceptron (MLP) within a neural network.

18. The computer program product as in claim 17, wherein an elastic loss function component for the MLP is based on a norm of a matrix representing the deformation model.

19. The computer program product as in claim 18, wherein the matrix is a Jacobian of the deformation model with respect to the position in the observation frame.

20. An electronic apparatus, the electronic apparatus comprising:
memory; and
controlling circuitry coupled to the memory, the controlling circuitry being configured to:
acquire image data representing a plurality of images, each of the plurality of images including an image of a scene within an observation frame, the scene including a non-rigidly deforming object viewed from a respective perspective;
generate a deformation model based on the image data, the deformation model describing movements made by the non-rigidly deforming object while the image data was generated, the deformation model being represented by a differentiable non-linear mapping between a position in the observation frame to a position in a canonical frame; and
generate a neural radiance field based on positions and viewing directions of casted rays through the positions in the canonical frame, the neural radiance field providing a mapping between the positions and viewing directions to a color and optical density at each position in the observation frame, the color and optical density at each position in the observation frame enabling a viewing of the non-rigidly deforming object from a new perspective.

* * * * *